Feb. 6, 1940.  J. V. COOK  2,189,167
BAKING OVEN
Filed March 26, 1938  2 Sheets-Sheet 1

Inventor:
John V. Cook
By: Leslie W. Fricke
Atty.

Feb. 6, 1940.    J. V. COOK    2,189,167
BAKING OVEN
Filed March 26, 1938    2 Sheets-Sheet 2

Inventor:
John V. Cook
By: Leslie W. Frier
Atty.

Patented Feb. 6, 1940

2,189,167

UNITED STATES PATENT OFFICE 2,189,167

BAKING OVEN

John V. Cook, Chicago, Ill., assignor to The Petersen Oven Company, Chicago, Ill., a corporation of Illinois Application March 26, 1938, Serial No. 198,295

12 Claims. (Cl. 107—63)

My invention relates to baking ovens and it has for its object the provision of a new and improved form and arrangement of parts in a device of this type whereby the heat may be distributed more evenly and more effectively throughout the baking chamber transversely thereof. To this end, it is one of the objects of my invention to provide an improved system of vanes and dampers for regulating the delivery of heat to a series of flues by which the heat is distributed through the oven. It is another object also to provide a single zone oven having only space enough between its top and bottom walls to accommodate an endless conveyor having its top and bottom leads each located in substantially horizontal position from one end of the baking chamber to the other, the arrangement being such as to provide homogeneous air and steam conditions throughout the chamber.

It is one of the objects of my invention to provide an improved circulating heat arrangement by which heated gases are passed a plurality of times through the flues so as to get the maximum benefit therefrom and in which the major portion of the stream of such heated gases after being cooled more or less by its passage through the flues is drawn through a mixing chamber where it is blended with a comparatively much smaller supply of fresh highly heated gases which is thereby brought down to the desired working temperature so as to avoid burning out the working parts. It is another object of my invention to provide an improved arrangement of mixing chamber and associated parts whereby the mingling of the two components of the gases to make up the heating stream may be effected thoroughly and expeditiously for securing the desired even application of the heat throughout the oven. It is another object of my invention to provide an improved arrangement of this type of such construction that the heating may be effected with a minimum loss of heat so as to cut down the cost of the heating operation to a minimum while at the same time sufficient fresh air shall be introduced for supporting combustion effectively in connection with a burner of any approved type.

It is another object of my invention to provide an improved arrangement whereby greatly improved results may be attained with respect to the expansion and contraction of the oven parts as the temperature of the oven is raised for a baking operation and is then permitted to fall between periods of use of the oven and whereby the uneven expansion of parts located adjacent to each other may be effected with a minimum tendency for the change in size or shape of one part to cause an adjacent part also to be warped or distorted or to be placed under heavy tension.

It is another object of my invention to improve baking ovens in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings, all of which are more or less diagrammatic—

Figure 4:
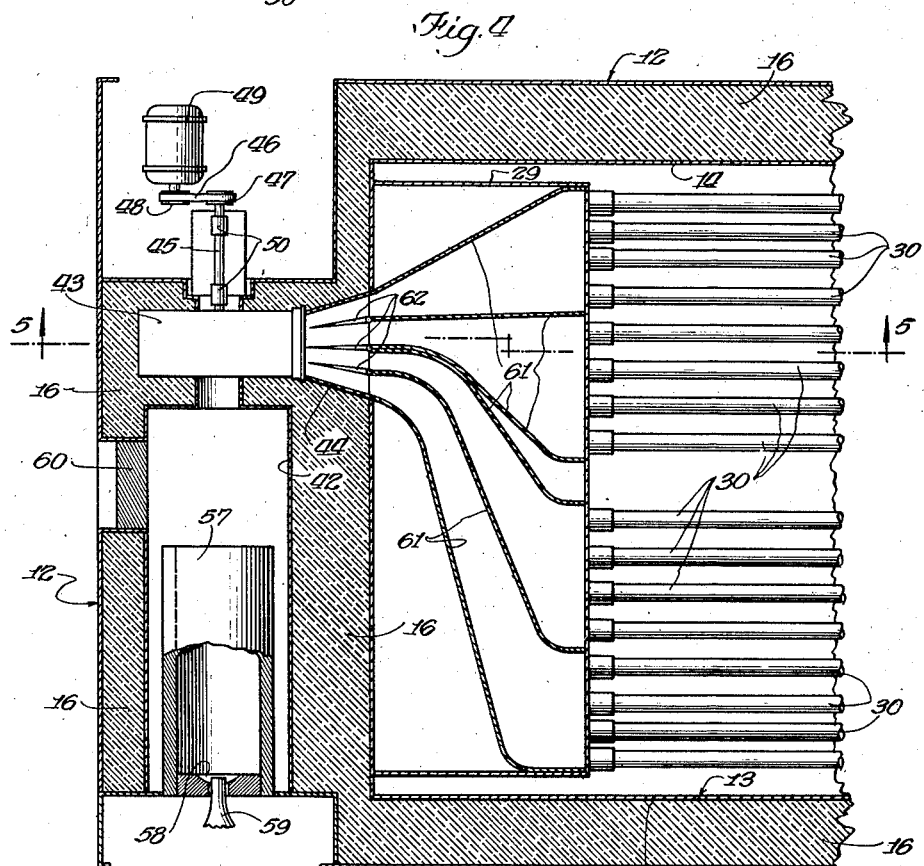
Fig. 4 is a horizontal sectional view taken on an enlarged scale at line 4—4 of Fig. 1.

Referring now to the several figures of the drawings, in which corresponding parts are indicated by the same reference characters, 12 indicates an outside housing formed preferably of sheet metal supported and reinforced by any approved type of framework not shown. Within the outside housing 12, I have provided a baking chamber unit 13 also having sheet metal wall portions comprising side walls 14 and 15 as shown in Fig. 4 and cooperating wall portions of any approved type. Between the walls of the housing 12 and the walls of the baking chamber unit 13, I have provided heat insulation material 16 of any approved type by which the oven is effectively insulated against undue loss of heat from the baking chamber.

At the forward end of the oven, the baking chamber is closed by a door 17 of any approved type, a removable panel 18, and a depending fixed panel portion 19 above the door. In the arrangement shown, the depending panel portion 19 and the removable panel 18 are formed of sheet metal having walls in spaced relation and having insulation 16 therein. In the arrangement shown, the door 17 is slidable upwardly being supported by cables 20 at opposite sides of the oven running over sheaves 21 and provided at their lower ends with a counterweight 22 underneath the baking oven as is shown in Fig. 1 for facilitating the opening and closing movements of said door.

Figure 1:
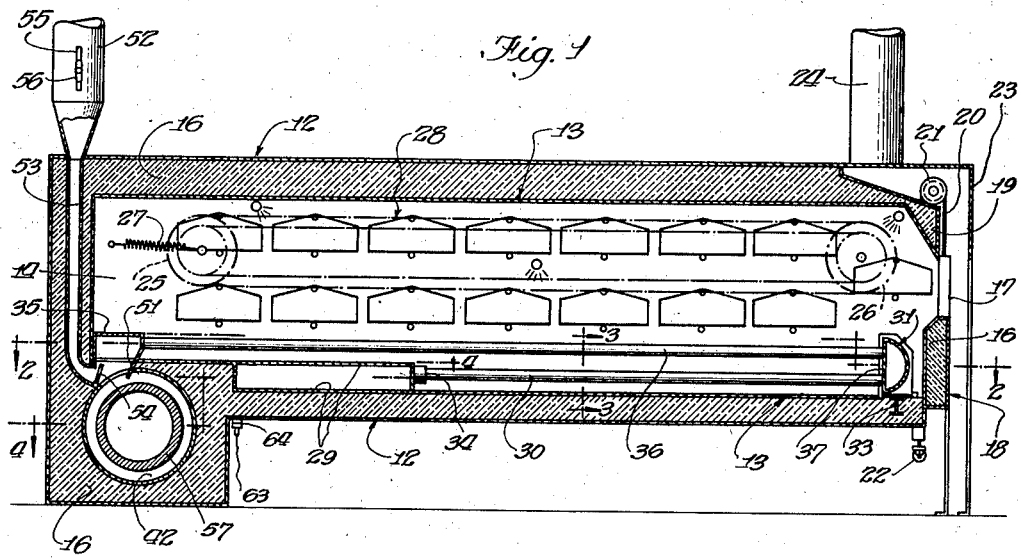
Fig. 1 is a longitudinal vertical sectional view through the preferred form of my improved oven, being taken substantially at line 1—1 of Fig. 2.

As is best shown in Fig. 1, a hood structure 23 is provided over the upper edge of the door 17, connected at its upper face with a stack 24 in position to receive and carry away any heated gases escaping between the door 17 and the adjacent walls, being effective when the door is opened to control the escaping hot air so as to make it safe for an operator to work adjacent to the front end of the oven.

Within the baking chamber, I have mounted an endless conveyor of any approved type operating between sprocket gears 25 and 26, which are shown only diagrammatically since they form in and of themselves no part of my present invention. In the arrangement shown, the sprockets 25 are held resiliently in position by means of springs 27 which are adapted to keep the conveyor at the desired operating tension as expansion takes place during the time when the oven is being heated ready for use. This conveyor, indicated generally by the numeral 28, is made of metal having substantially the same coefficient of expansion as that of the side walls 14 and 15 so that the springs 27 are maintained at substantially uniform tension during expansion and contraction of the parts.

Figure 2:
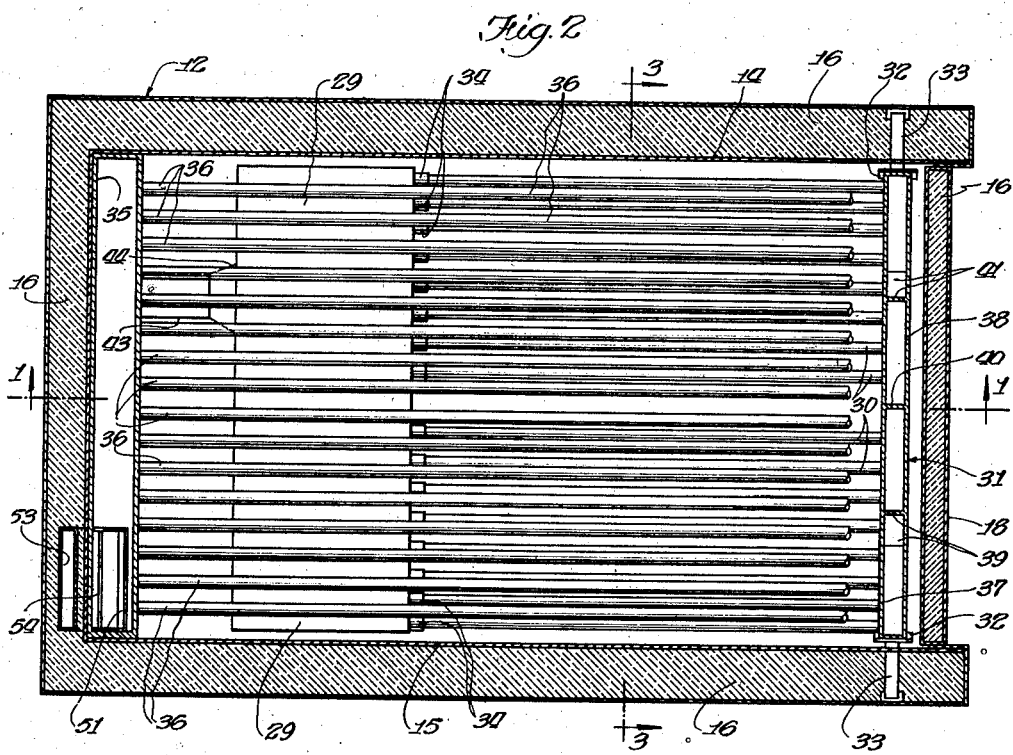
Fig. 2 is a horizontal sectional view taken substantially at line 2—2 of Fig. 1.
Figure 3:
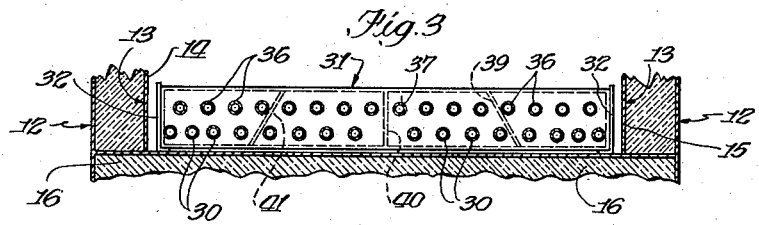
Fig. 3 is a vertical sectional view through my improved oven, being taken substantially at the lines 3—3 in Figs. 1 and 2.
Figure 5:
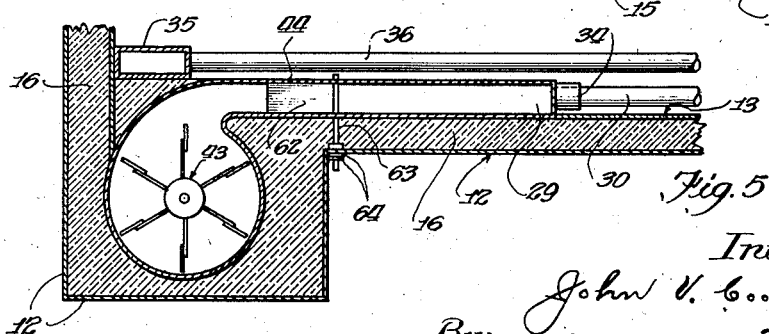
Fig. 5 is a vertical sectional view taken at line 5—5 of Fig. 4.

Within the baking chamber, I have mounted a header 29 formed of sheet metal and being located at an intermediate point lengthwise of the oven. At its forward face, the header 29 has a series of flues 30 connected therewith, such flues being in spaced relation with respect to each other throughout substantially the full width of the baking chamber and the oven as shown in Figs. 2 and 4. The flues 30, which in the arrangement shown are in the form of metal pipes are connected at their forward ends to a header 31 also formed of sheet metal and extending transversely of the oven parallel with the header 29. The header 31 is supported by means of plates 32 (see Fig. 3) which are slidably mounted at opposite ends of an I-beam 33 extending transversely of the oven and supported in position by any suitable connection with the framework of the housing 12. In the construction illustrated, the flues 30 have a rigid connection with the header 31, preferably by means of screw threads, while at their opposite ends such flues have a slip joint connection with the header 29, such slip joint connection being effected by the use of short sleeves 34 connected with the header and receiving the rear ends of the flues 30 slidably therein, as is best shown in Fig. 5. At the opposite end of the oven, I have provided a third header 35 also formed of sheet metal, being connected with the header 31 by means of a series of flues 36 which in the arrangement shown have a rigid connection with both of said headers. In the arrangement shown, the flues 36, generally speaking, are in staggered relation horizontally with respect to the flues 30, as is clearly shown in Figs. 2 and 3, with the result that the two sets of flues have a maximum efficiency with respect to the application of heat uniformly throughout the full width of the baking chamber.

By the use of my improved arrangement as above described, with the header 31 slidable forwardly and backwardly with respect to the I-beam 33, such header 31 is free to move longitudinally of the oven with respect to the adjacent parts as may be necessary by reason of uneven expansion of the flues 36 with respect to the expansion of the adjacent parts. In case the expansion of the flues 36 shall differ slightly from that of the flues 30, such flues 30 are adapted to slide to the necessary extent with respect to the header 29 so as to prevent any tendency for a distortion of any of the parts. By reason of my improved arrangement comprising the differential connection of the flues to the headers, the expansion of the parts is permitted without the application of any great stress on the parts for warping them or otherwise, whereby the wear and tear on the structure is very greatly reduced as compared with that in connection with rigid structures such as have been employed heretofore.

In my improved construction, the header 31 is preferably formed of two parts comprising a plate portion 37 which has a rigid connection with the flues and a dished portion 38 which is removably mounted for providing access to the flues when desired. When access to the flues is desired, the door or panel 18 can be removed for such purpose. As is clearly shown in Figs. 2 and 3, the header 31 is provided with partitions 39, 40 and 41 at spaced intervals therealong so as to divide the flues into four sets for assuring that the heated gases going forward through the flues 30 of one set shall return through the flues 36 of the same set.

The means in the construction illustrated for producing the required heat and forcing it through the flues 30 and 36 comprises a mixing chamber 42 which in the arrangement shown is cylindrical in form extending from one side of the furnace to about the middle of the furnace transversely thereof, such chamber opening at its inner end to a centrifugal air pump 43 which is connected by means of a duct 44 with the header 29 (see Figs. 4 and 5). In the arrangement shown, the blower or pump 43 is connected by means of a shaft 45, a sprocket chain 46 and sprockets 47 and 48 with the drive shaft of an electric motor 49, the shaft 45 being journaled in suitable bearings 50 mounted rigidly in position. The arrangement is such that the air or other gases taken by the pump 43 from the mixing chamber 42 are delivered through the duct 44 and header 29 to the flues 30 and thence through the header 31 and flues 36 to the header 35 from which such gases are adapted to pass again to the mixing chamber 42 through a duct 51 opening from the header 35 at one side of the furnace as is best shown in Fig. 2.

In the arrangement shown, a stack 52 rises from the housing 12 at its rear end portion, communicating at its lower end with a conduit 53 which opens at its lower end into the duct 51, as is best shown in Fig. 1. By this arrangement, the stack 52 is adapted to apply suction upon the header 35 in opposition to that applied through the action of the pump or blower 43. For controlling the proportion of the air and other gases passing out through the stack 52 as compared with those recirculating through the flues 30 and 36, I have provided a pivotally mounted damper 54 at the point where the conduit 53 opens into the duct 51. By a proper adjustment of the damper 54 about its horizontal axis the proportion of the gases escaping through the stack as compared with those passing again through the flues 30 and 36 can be controlled. Any suitable means may be provided as desired for locking the damper 54 in the desired adjusted position. The stack 52 is preferably provided with a damper 55 of any suitable type operated by a handle 56 for controlling the escape of heat through the stack.

In the arrangement shown, the means for producing heat within the furnace comprises a tubular member 57 formed of a good quality of fire clay having its walls in spaced relation to the walls of the mixing chamber 42, as is best shown in Figs. 1 and 4, such tubular member being open at its inner end directly into the mixing chamber. At its outer end, the tubular member 57 is provided with an opening 58 therefrom through which the nozzle 59 of an oil burner is to be inserted for the introduction of a combustible mixture of vaporized oil and air for combustion within the tubular member 57, as will be readily understood.

As is best shown in Fig. 1, the duct 51 opening from the header 35 to the mixing chamber 42 is located at one side of the mixing chamber so as to direct the gases through the duct 51 tangentially with respect to the combustion chamber member 57 so as to cause the air to swirl about the tubular member so as to insure a thorough blending of the partially cooled gases from the header 35 with the highly heated smaller supply of gases emerging from the end of the combustion chamber member 57. At one side of the mixing chamber 42, I have provided a blowout pad 60 of any suitable type which is readily removable from position in case greatly excessive pressure should develop within such chamber.

For insuring the desired even distribution of the heated gases to the several flues 30 and 36 spaced transversely of the oven, I have provided in the header 29 a plurality of vanes 61 having their rear edges located opposite the forward end of the duct 44, such vanes being in forwardly divergent position with respect to each other so as to provide forwardly divergent paths for the heated gases entering the header from the duct 44. In connection with such vanes, I have provided three dampers 62 pivotally mounted upon vertical axes opposite the rear edges of the intermediate vanes 61, such dampers being in the form of blades which are adapted to swing toward and from each other about their pivotal axes. As will be readily understood, by an adjustment of such blades 62 transversely with respect to each other, the proportions of the heated gases entering the header through the duct 44 can be regulated as desired. In the arrangement shown, the blades 62 are mounted upon pivot pins 63 which extend downwardly from the header 29 through the bottom wall of the housing 12 so as to provide access to such pivot pins below the oven. Lock nuts 64 are provided upon each of said pivot pins for locking the dampers in any desired adjusted position.

I have found in practice that when the dampers 62 have been adjusted properly after the complete installation of an oven and when the damper 54 has likewise been adjusted to its most effective position, the oven is in condition for long continued effective operation without the necessity for any further adjustment of these parts. I have found that with the dampers properly positioned the distribution of the heat throughout the baking chamber transversely thereof is very even as would ordinarily be desired and the escape of heat through the stack 52 is limited so as to correspond with the amount of fresh air required for supporting combustion within the combustion chamber member 57.

While I prefer to employ the construction and arrangement as illustrated in my drawings and as above described, it is to be understood that my invention is not limited thereto except so far as the claims may be so limited, it being understood that changes might well be made in the form and arrangement of the parts without departing from my invention.

I claim:

1. In a baking oven, the combination of a horizontally positioned baking chamber of substantially uniform height and having a door at one end, heating flues within and extending substantially the full length of the chamber in substantially horizontal position, and means including hanging trays for carrying products to be baked along a substantially horizontal path above said flues and substantially from one end to the other of said chamber and then along a substantially horizontal path at a higher level again substantially from one end to the other of the chamber, the combined height of the hanging trays in the two paths being approximately equal to one-half the distance from the tops of the flues to the top wall of the chamber and the spaces between the trays in the two paths, between the trays in the lower path and the flues and between the trays in the upper path and the top wall of the chamber being substantially equal.

2. In a baking oven, the combination of a header mounted at one end of the baking chamber, a second header located at a lower level in spaced relation to the ends of the baking chamber, a third header located at the opposite end portion of the baking chamber and movable toward and from said first named two headers, a set of flues connected between said first and third headers, and a set of flues of considerably shorter length connected between said second and third headers, one of said sets of flues having a slip joint connection with at least one of said headers to compensate for uneven longitudinal expansion or contraction of said flues or parts associated therewith.

3. In a baking oven, the combination of a header fixedly mounted at one end of the baking chamber, a second header fixedly mounted at a lower level in spaced relation to the ends of the baking chamber, a third header slidably mounted at the opposite end portion of the baking chamber, a series of flues rigidly connected with said first and third headers, and a second series of flues of considerably shorter lengths connected rigidly with said third header and having slip joint connection with said second header to compensate for uneven longitudinal expansion or contraction of said flues or parts associated therewith.

4. In a baking oven, the combination of a header extending across the bottom of the baking chamber adjacent one end thereof, a second header extending across the baking chamber adjacent but at a higher level than the first header, a series of flues in said chamber extending from the first header and connected with said second header for delivering moderately heated gases to the second header, a transversely disposed mixing chamber below said second header at one side of the oven, means for drawing gases from said mixing chamber at its inner end and delivering them to the first header, a tubular member in said mixing chamber in spaced relation thereto at the outer end portion of the mixing chamber and opening into the mixing chamber at an intermediate point therealong, and a duct leading from the outer end portion of said second header to said mixing chamber tangentially of said tubular member so as to cause gases entering the mixing chamber from said second header to have a swirling motion about said tubular member for thoroughly blending with other heated gases emerging from the open end of said tubular member.

5. In a baking oven, the combination of a header extending across the baking chamber transversely thereof, a second header extending across said baking chamber at a higher level, a series of flues for conducting heated gases from said first named header to said second header for heating the baking chamber, a mixing chamber below said second header, a tubular member in said mixing chamber in spaced relation thereto at one end of the mixing chamber and opening thereinto at an intermediate point therealong, a duct leading from said second header to said mixing chamber tangentially of said tubular member, means comprising a pump for drawing gases from said mixing chamber and said second header and delivering the gases to said first named header for passage through said flues, other means communicating with said duct for diverting a portion of the gases from said second header, and a damper in said duct for varying the relative size of the opening from the duct to said mixing chamber as compared with the size of the opening from the duct to said second named means for diverting gases from said header.

6. In a baking oven, the combination of two headers extending across the baking chamber transversely thereof, a series of flues connected with said headers in spaced relation to each other transversely of the oven for conducting heated gases from one header to the other for heating the baking chamber, a duct leading into one of said headers and of small width as compared with the width of the baking chamber, means for delivering a stream of heated gases to said header through said duct, and means in said duct and said connected header for splitting up said stream of gases and directing parts of the stream to the flues at different portions of the baking chamber transversely thereof for providing a substantially even distribution of the heat.

7. In a baking oven, the combination of a header extending across the baking chamber transversely thereof at an intermediate point lengthwise of the oven, a second header extending across said baking chamber at one end portion of the oven and at a higher level than that of the first named header, a series of flues connected with said headers and extending from said first named header substantially to the end of the oven and thence back substantially the full length of the oven to said second header, said flues being arranged in spaced relation to each other substantially entirely across the oven transversely thereof for conducting heated gases from said first named header to said second header for heating the baking chamber, a duct leading into said first named header at the opposite side thereof from that at which said flues are connected thereto and being comparatively narrow as compared with the width of the oven, means for delivering a stream of heated gases to said header through said duct, and means in said duct and said header for splitting up said stream of gases and directing parts of the stream to the flues at different portions of the baking chamber transversely thereof for providing a substantially even distribution of the heat.

8. In a baking oven, the combination of two headers extending across the baking chamber transversely thereof, a series of flues connected with said headers in spaced relation to each other transversely of the oven for conducting heated gases from one header to the other for heating the baking chamber, a duct leading into one of said headers and of small width as compared with the width of the baking chamber, means for delivering a stream of heated gases to said header through said duct, vanes in said first named header in spaced relation to each other opposite said duct and diverging with respect to each other from said duct for directing parts of the stream of heated gases to the flues at different portions of the baking chamber transversely thereof, and adjustable means in said duct in association with the several intermediate vanes for splitting the stream of gases into parts of the desired relative proportions for delivery to the several diverging paths between said vanes for providing a substantially even distribution of the heat.

9. In a baking oven, the combination of two headers extending across the baking chamber transversely thereof, a series of flues connected with said headers in spaced relation to each other transversely of the oven for conducting heated gases from one header to the other for heating the baking chamber, a duct leading into one of said headers and of small width as compared with the width of the baking chamber, means for delivering a stream of heated gases to said header through said duct, vanes in said first named header in spaced relation to each other opposite said duct and diverging with respect to each other from said duct for directing parts of the stream of heated gases to the flues at different portions of the baking chamber transversely thereof, and dampers in said duct in association with the several intermediate vanes and each comprising a blade member adjustable toward and from the adjacent blade means for splitting the stream of gases into parts of the desired relative proportions for delivery to the several diverging paths between said vanes for providing a substantially even distribution of the heat.

10. In a baking oven, the combination of two headers extending across the baking chamber transversely thereof, a series of flues connected with said headers in spaced relation to each other transversely of the oven for conducting heated gases from one header to the other for heating the baking chamber, a duct leading into one of said headers and of small width as compared with the width of the baking chamber, means for delivering a stream of heated gases to said header through said duct, vanes in said first named header in spaced relation to each other opposite said duct and diverging with respect to each other from said duct for directing parts of the stream of heated gases to the flues at different portions of the baking chamber transversely thereof, dampers in said duct in association with the several intermediate vanes and each comprising a blade member pivotally mounted on a vertical axis, and means accessible from the exterior of the baking chamber for holding said blades in the desired angular relation to each other for splitting the stream of gases into parts of the desired relative proportions for delivery to the several diverging paths between said vanes for providing a substantially even distribution of the heat.

11. In a baking oven, the combination of a header extending across the baking chamber transversely thereof, a set of flues connected with said header in spaced relation to each other transversely of the oven, means for delivering heated gases through the several flues to said header for heating the baking chamber, a second set of flues connected with said header and also in spaced relation to each other transversely of the oven for taking the heated gases from said header so as to assist in heating the baking chamber, and a plurality of partitions across said header in spaced relation to each other transversely of the oven for insuring that the gases entering said header through a flue of said first named set shall pass from the header to a flue of the second set having approximately the same location transversely of the oven.

12. In a baking oven, the combination of a header extending across the baking chamber transversely thereof, a set of flues connected with said header in spaced relation to each other transversely of the oven for conducting heated gases to said header for heating the baking oven, a duct leading into said header and of small width as compared with the width of the baking chamber, means for delivering a stream of heated gases to said header through said duct, means in said duct and said header for splitting up said stream of gases and directing parts of the stream to the flues at different portions of the baking chamber transversely thereof, a second header extending across the baking chamber transversely thereof and connected with said flues, a second set of flues connected with said second header and also in spaced relation to each other transversely of the oven for taking the heated gases from said second header, and a plurality of partitions across said second header in spaced relation to each other transversely of the oven for insuring that the gases entering said second header through a flue of the first named set shall pass from the header to a flue of the second set having approximately the same location transversely of the oven so as to provide a substantially even distribution of the heat throughout the baking chamber.

JOHN V. COOK.